United States Patent
Kobayashi

[11] Patent Number: 5,903,374
[45] Date of Patent: May 11, 1999

[54] PORTABLE ELECTRONIC APPARATUS WITH INFRARED COMMUNICATION FUNCTION

[75] Inventor: Fumiyuki Kobayashi, Tokyo, Japan

[73] Assignee: NEC Corporation, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/610,589

[22] Filed: Mar. 7, 1996

[30] Foreign Application Priority Data

Mar. 10, 1995 [JP] Japan ................................. 7-050700

[51] Int. Cl.⁶ ........................... H04B 10/10; H04B 10/22
[52] U.S. Cl. ..................... 359/159; 359/142; 359/152; 359/163
[58] Field of Search .................................. 359/159, 163, 359/142, 193, 144, 113–114, 152–153, 172

[56] References Cited

U.S. PATENT DOCUMENTS

| | | | |
|---|---|---|---|
| 4,330,204 | 5/1982 | Dye | 359/159 |
| 4,843,635 | 6/1989 | Okazaki | 359/142 |
| 4,856,090 | 8/1989 | Kitani et al. | 359/159 |

FOREIGN PATENT DOCUMENTS

| | | | |
|---|---|---|---|
| 552080 | 7/1993 | European Pat. Off. | 359/142 |
| 4237867 | 5/1994 | Germany | 359/142 |
| 85150 | 5/1984 | Japan | 359/159 |
| 292428 | 12/1986 | Japan | 359/159 |
| 0271532 | 11/1987 | Japan | 359/142 |
| 59031 | 3/1988 | Japan | 359/159 |
| 3221000 | 9/1991 | Japan | 359/142 |
| 4-134997 | 5/1992 | Japan . | |
| 6350539 | 12/1994 | Japan . | |
| 2141258 | 12/1984 | United Kingdom | H04B 9/00 |

*Primary Examiner*—Leslie Pascal
*Attorney, Agent, or Firm*—Ostrolenk, Faber, Gerb & Soffen, LLP

[57] ABSTRACT

This invention relates to a portable electronic apparatus capable of performing infrared communication through an infrared emitting/receiving unit including an infrared emitting/receiving element. In this apparatus, the infrared emitting/receiving unit is movably mounted on a main body of the portable electronic apparatus so as to externally change a direction of the infrared emitting/receiving unit. According to the portable electronic apparatus of this invention, the direction of the infrared emitting/receiving unit can be changed over two outer surfaces of the portable electronic apparatus main body, or can slide on at least one outer surface of the portable electronic apparatus main body.

13 Claims, 6 Drawing Sheets

PORTABLE ELECTRONIC APPARATUS WITH INFRARED COMMUNICATION FUNCTION

BACKGROUND OF THE INVENTION

1. Field of the Invention

The present invention relates to a portable electronic apparatus and, more particularly, to a portable electronic apparatus with an infrared communication function.

2. Description of the Prior Art

Conventionally, portable electronic apparatuses 21a and 21b such as portable information terminals and notebook type personal computers respectively comprise infrared emitting/receiving element sections 22a and 22b in the apparatus main bodies, as shown in FIG. 1. The portable electronic apparatuses 21a and 21b can perform communication (infrared communication) using infrared IR therebetween through the infrared emitting/receiving element sections 22a and 22b.

In a conventional portable electronic apparatus with an infrared communication function, an infrared emitting/receiving element section is fixed to the electronic apparatus main body. To perform infrared communication between portable electronic apparatuses, the infrared emitting/receiving element sections of the portable electronic apparatuses must face each other.

When, therefore, the direction or position of the portable electronic apparatus is not easily changed, e.g., when users who try to perform infrared communication therebetween in a conference do not sit facing each other, or when information is to be simultaneously transmitted to users, the infrared emitting/receiving element section of a given electronic apparatus must face the infrared emitting/receiving element section of a communication partner's electronic apparatus, resulting in an inconvenient operability.

On the other hand, a remote controller capable of changing the angle of its infrared emitting element in an air conditioner installed in a large room of, e.g., a building is disclosed in, e.g., Japanese Unexamined Patent Publication No. 4-134997.

The structure of this remote controller will be briefly described with reference to a longitudinal sectional view in FIG. 2. A light emitting device 8 of the remote controller comprises an arcuated outer covering portion 7 consisting of an infrared transmitting resin, and a grooved, arcuated guide portion 10. The light emitting device 8 of the remote controller is mounted on a wall 1 through an attachment surface 4.

An infrared emitting element 12 is conductively mounted on a sub-printed board 11. A coupling portion 6 engaged with one end side of a substantially L-shaped hook portion 5 integrally formed with a vertically slidable knob portion 13 is arranged on one end of the sub-printed board 11. The distal end of a support piece 3 extending perpendicularly from the other end side of the hook portion 5 holds the sub-printed board 11.

When, therefore, the knob portion 13 is manually operated in a space portion 2 before mounting, the infrared emitting element 12 is vertically slid. The remote controller can be mounted on the wall after the direction of the infrared emitting element 12 is adjusted to the direction of the air conditioner in advance.

In a wall-mounted remote controller having such a slidable infrared emitting element, the direction of the infrared emitting element 12 can be adjusted to the fixed air conditioner before mounting even if the knob portion 13 is arranged inside.

In a portable electronic apparatus, however, the direction of an infrared emitting element must be freely changeable because the position or direction of a communication partner's electronic apparatus is not always the same.

For this reason, the structure of an infrared emitting element capable of changing its direction only before mounting is not suitable for a portable electronic apparatus.

SUMMARY OF THE INVENTION

The present invention has been made in consideration of the above situation, and has as its object to provide a portable electronic apparatus in which the direction of an infrared sensing element can be externally, always freely changed.

It is another object of the present invention to provide a portable electronic apparatus capable of performing infrared communication over at least two surface directions without changing the direction of an electronic apparatus main body.

To achieve the above objects, according to a basic aspect of the present invention, there is provided a portable electronic apparatus capable of performing infrared communication through an infrared emitting/receiving unit including an infrared emitting/receiving element, wherein the infrared emitting/receiving unit is movably mounted on a main body of the portable electronic apparatus so as to externally change a direction of the infrared emitting/receiving unit.

The infrared emitting/receiving unit defined in the basic aspect comprises a projecting portion formed to project outward from a housing of the infrared emitting/receiving unit, and a first electrode arranged at a distal end of the projecting portion and connected to the infrared emitting/receiving element, while the portable electronic apparatus main body defined in the basic aspect comprises a recessed portion or notch formed in at least one outer surface so as to house the infrared emitting/receiving unit, a shaft engaging portion formed in the recessed portion or notch so as to be engaged with the projecting portion of the infrared emitting/receiving unit, and a second electrode arranged on an end face of the shaft engaging portion so as to contact the first electrode.

The direction of the infrared emitting/receiving unit defined in the basic aspect can be changed over two outer surfaces of the portable electronic apparatus main body.

The infrared emitting/receiving unit defined in the basic aspect can slide on at least one surface of the portable electronic apparatus main body.

By employing the above-described arrangement, the portable electronic apparatus according to the present invention can change the infrared emitting/receiving unit in a desired direction of a user, if necessary.

Since the direction of the infrared emitting/receiving unit can be changed over two or more surfaces of the portable electronic apparatus main body, infrared communication can be more widely performed regardless of the direction or installation position of the portable electronic apparatus. This effect becomes more remarkable in a low-profile portable electronic apparatus.

Further, infrared communication can be widely performed by using a slidable infrared emitting/receiving unit. This slide surface may be arranged over two surfaces of the portable electronic apparatus main body.

The above and many other advantages, features and additional objects of the present invention will become manifest to those versed in the art upon making reference to the following detailed description and accompanying drawings in which preferred structural embodiments incorporating the principles of the present invention are shown by way of illustrative example.

DETAILED DESCRIPTION OF PREFERRED EMBODIMENTS

Figure 1:
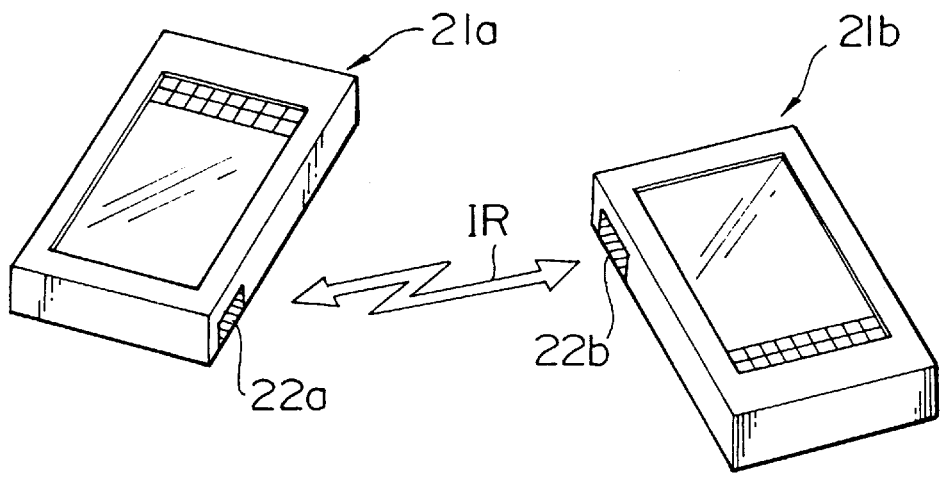
FIG. 1 is a perspective view showing an example of the outer appearance of a conventional portable electronic apparatus.
Figure 2:
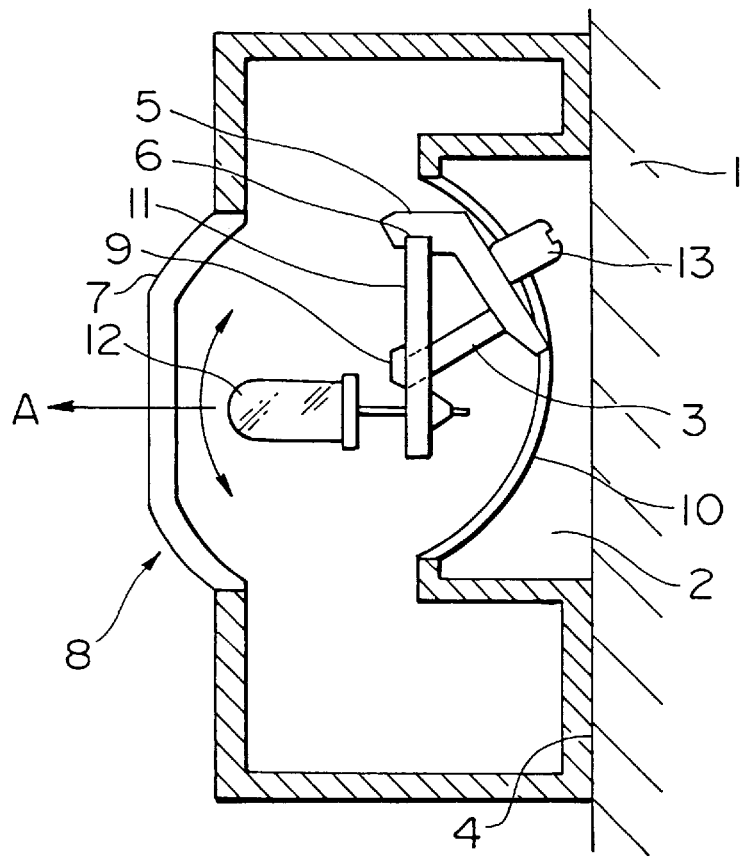
FIG. 2 is a schematic sectional view showing a light-emitting device in a remote controller of a conventional air conditioner.
Figure 3A:
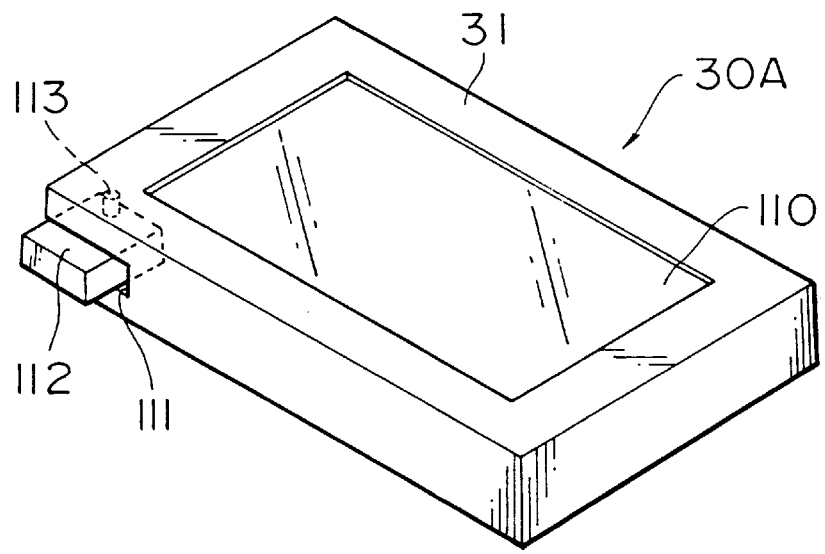
FIGS. 3A, 3B, and 3C are a perspective view showing an outer appearance, and a plan view and a sectional view showing a main part according to the first embodiment of the present invention, respectively.
Figure 3B:
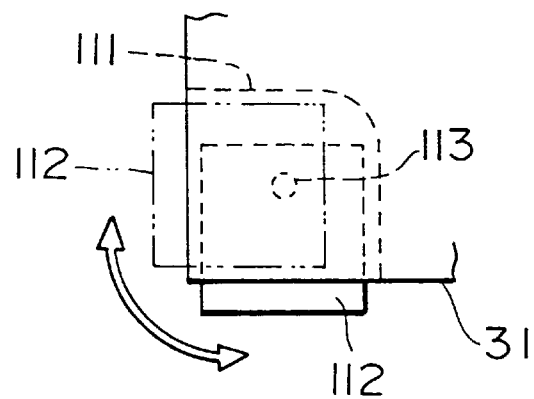
Figure 3C:
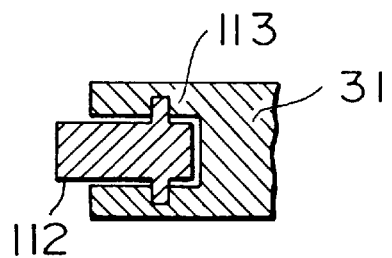

Preferred embodiments of the present invention will be described below with reference to the accompanying drawings FIGS. 3A, 3B, and 3C are a perspective view showing an outer appearance, and a plan view and a sectional view showing a main part according to the first embodiment of the present invention, respectively.

A portable electronic apparatus 30A comprises a main body 31, a display 110, and a recessed portion 111 formed in one end portion of the outer surface of the main body 31. An infrared emitting/receiving unit 112 having an infrared emitting/receiving element is mounted on the recessed portion 111 through a rotating shaft 113 so as to be horizontally rotatable.

The horizontal infrared communication range (direction) of the portable electronic apparatus 30A can be adjusted by rotating the infrared emitting/receiving unit 112. The infrared communication range (direction) can be adjusted without changing the position or direction of the portable electronic apparatus main body 31.

Since communication can be performed over two surfaces of the main body, as is apparent from FIG. 3B, communication can be more widely performed without changing the direction of the electronic apparatus main body 31.

FIG. 3C is a sectional view showing the coupling state of the infrared emitting/receiving unit 112 to the main body 31.

Figure 4A:
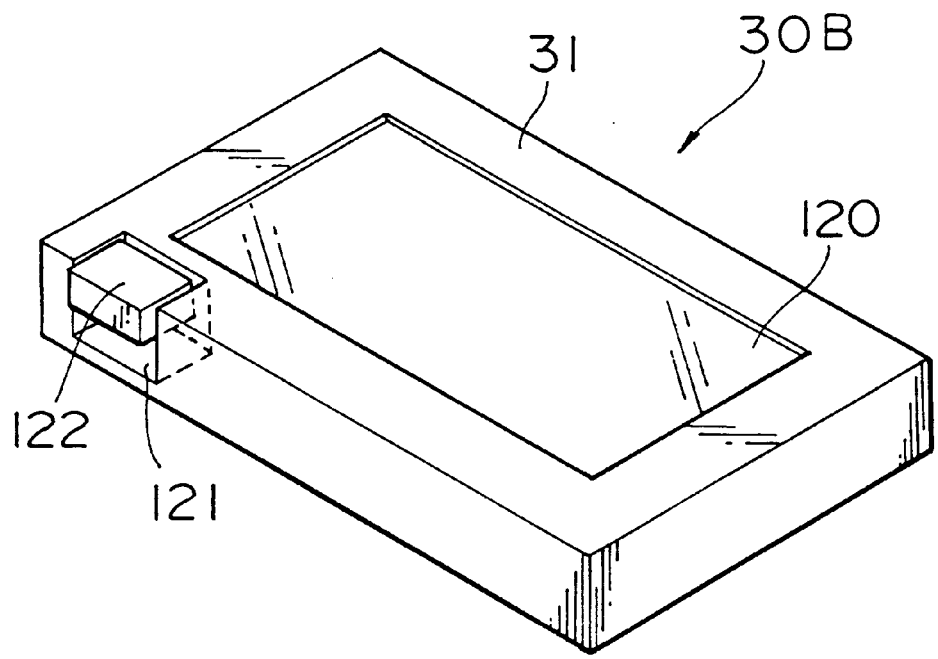
FIGS. 4A and 4B are a perspective view showing an outer appearance and a sectional view showing a main part according to the second embodiment of the present invention, respectively.
Figure 4B:
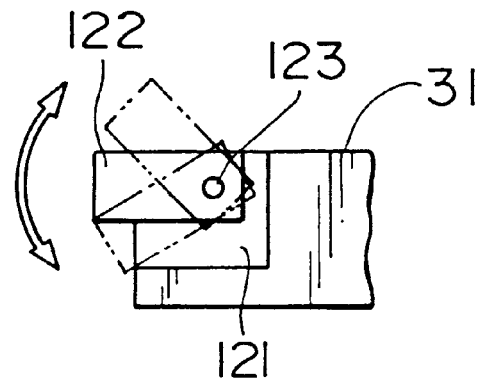

FIGS. 4A and 4B are a perspective view showing an outer appearance and a sectional view showing a main part according to the second embodiment of the present invention, respectively.

A portable electronic apparatus 30B comprises a main body 31, a display 120, and a notched portion 121 formed in part of the outer surface of the main body 31. An infrared emitting/receiving unit 122 having an infrared emitting/receiving element is mounted on the notched portion 121 through a rotating shaft 123 so as to be vertically rotatable.

The vertical infrared communication range (direction) of the portable electronic apparatus 30B can be adjusted by rotating the infrared emitting/receiving unit 122. The infrared communication range (direction) can be adjusted without changing the position or direction of the portable electronic apparatus main body 31.

Since the infrared emitting/receiving unit 122 is rotatable over two surface directions even in such a low-profile, compact portable electronic apparatus, the communication range can be further widened.

Figure 5A:
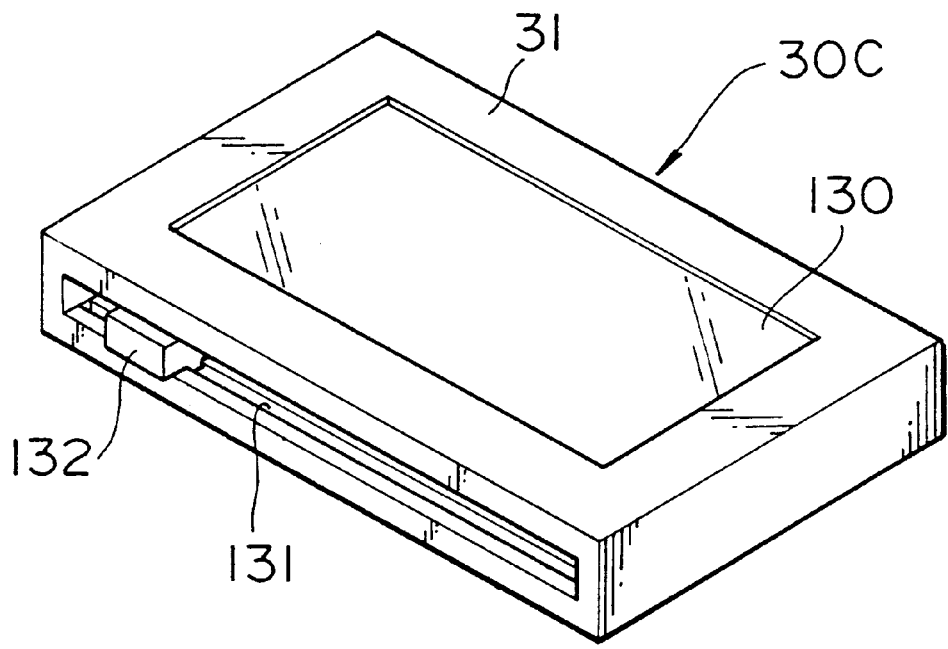
FIGS. 5A and 5B are a perspective view showing an outer appearance and a sectional view showing a main part according to the third embodiment of the present invention, respectively.
Figure 5B:
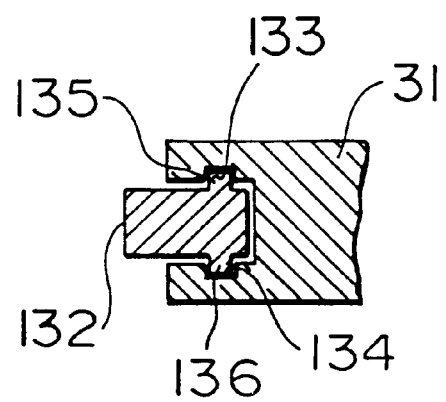

FIGS. 5A and 5B are a perspective view showing an outer appearance and a sectional view showing a main part according to the third embodiment of the present invention, respectively.

A portable electronic apparatus 30C comprises a main body 31, a display 130, and a slide groove 131 formed in at least one outer surface of the main body 31. An infrared emitting/receiving unit 132 having an infrared emitting/receiving element has projecting or shaft portions 135 and 136 which are respectively engaged with shaft engaging portions 133 and 134 of the slide groove 131. The infrared emitting/receiving unit 132 is slidable in the slide groove 131. The infrared emitting/receiving unit 132 can be stopped at an arbitrary position in the slide groove 131. The infrared emitting/receiving unit 132 of the portable electronic apparatus 30 can be moved within the range of the slide groove 131.

The infrared communication range (direction) can be adjusted without changing the position or direction of the portable electronic apparatus main body 31 because the position of the infrared emitting/receiving unit 132 of the portable electronic apparatus 30C can be moved within the slide groove 131. Since the infrared emitting/receiving unit 132 is slidable, infrared communication can be widely performed.

Figure 6:
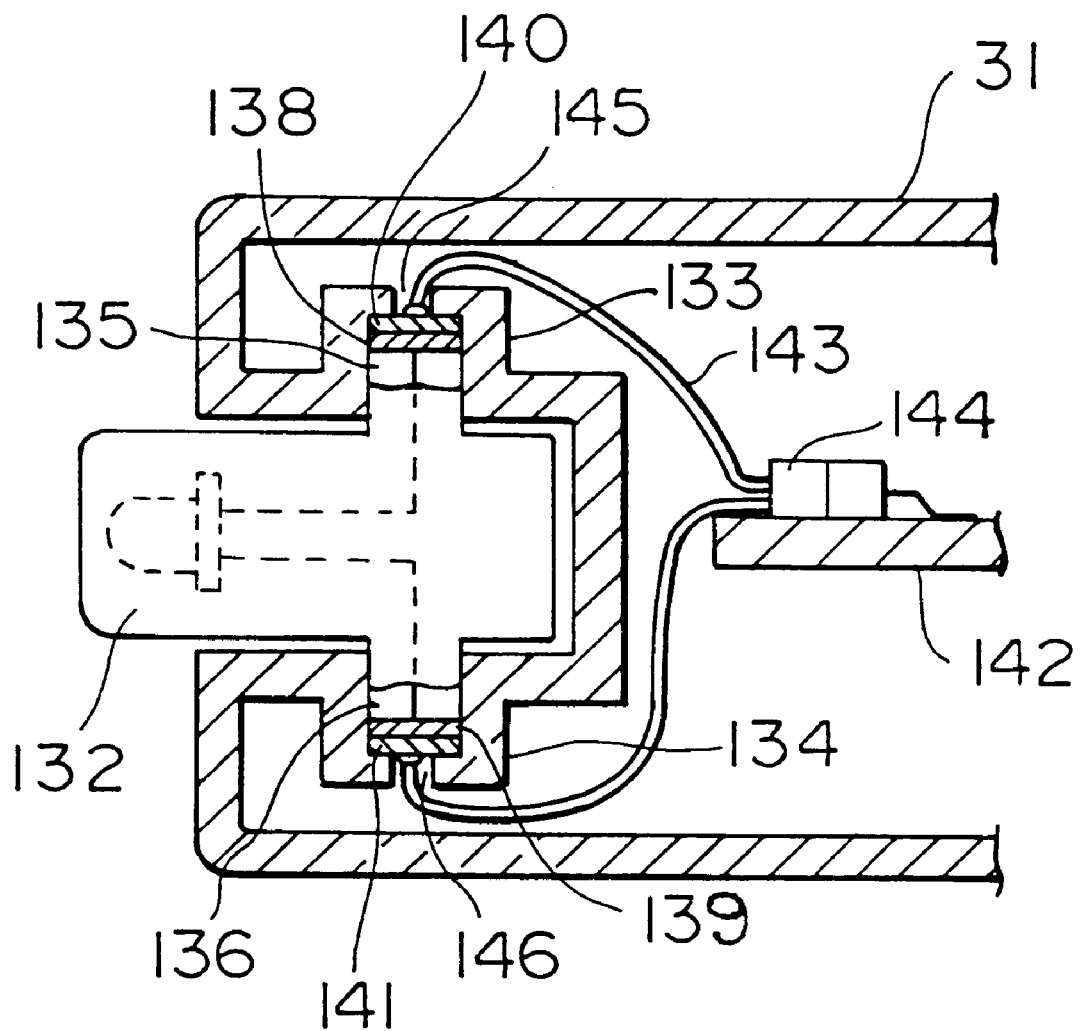
FIG. 6 is a partial sectional view showing a state where an infrared emitting/receiving unit shown in FIGS. 5A and 5B is mounted on a slide groove formed in a portable electronic apparatus main body.

FIG. 6 is a sectional view showing the infrared emitting/receiving unit 132 and the slide groove 131 shown in FIGS. 5A and 5B.

Through holes 145 and 146 are formed in the bottom portions of the shaft engaging portions 133 and 134 in the slide groove 131 of the portable electronic apparatus main body 31, respectively. Leaf-spring-like contact plates 140 and 141 (second electrodes) consisting of a conductive material such as a metal are arranged on the end faces of the shaft engaging portions 133 and 134, respectively. Part of these contact plates 140 and 141 is connected to an internal circuit on a printed board 142 through a connector 144 with cables 143.

Conductive elastic members 138 and 139 (first electrodes) such as leaf springs are formed at the distal ends of the projecting portions 135 and 136 of the infrared emitting/receiving unit 132, respectively. The elastic members 138 and 139 are electrically connected to an infrared emitting/receiving element arranged in the housing of the infrared emitting/receiving unit.

These elastic members 138 and 139 are connected to the contact plates 140 and 141, respectively. These elastic members serve as leaf springs to fix the infrared emitting/receiving unit 132 at a desired position.

In FIG. 6, the slide portion is formed on one surface However, if the slide portion is formed over two or more surfaces, communication can be more widely performed.

The structure shown in FIG. 6 can also be applied to the recessed portion and the notched portion in the infrared emitting/receiving units respectively shown in FIGS. 3A to 3C and FIGS. 4A and 4B. In this case, the projecting portions 135 and 136 are constituted by rotating shafts, respectively.

Figure 7:
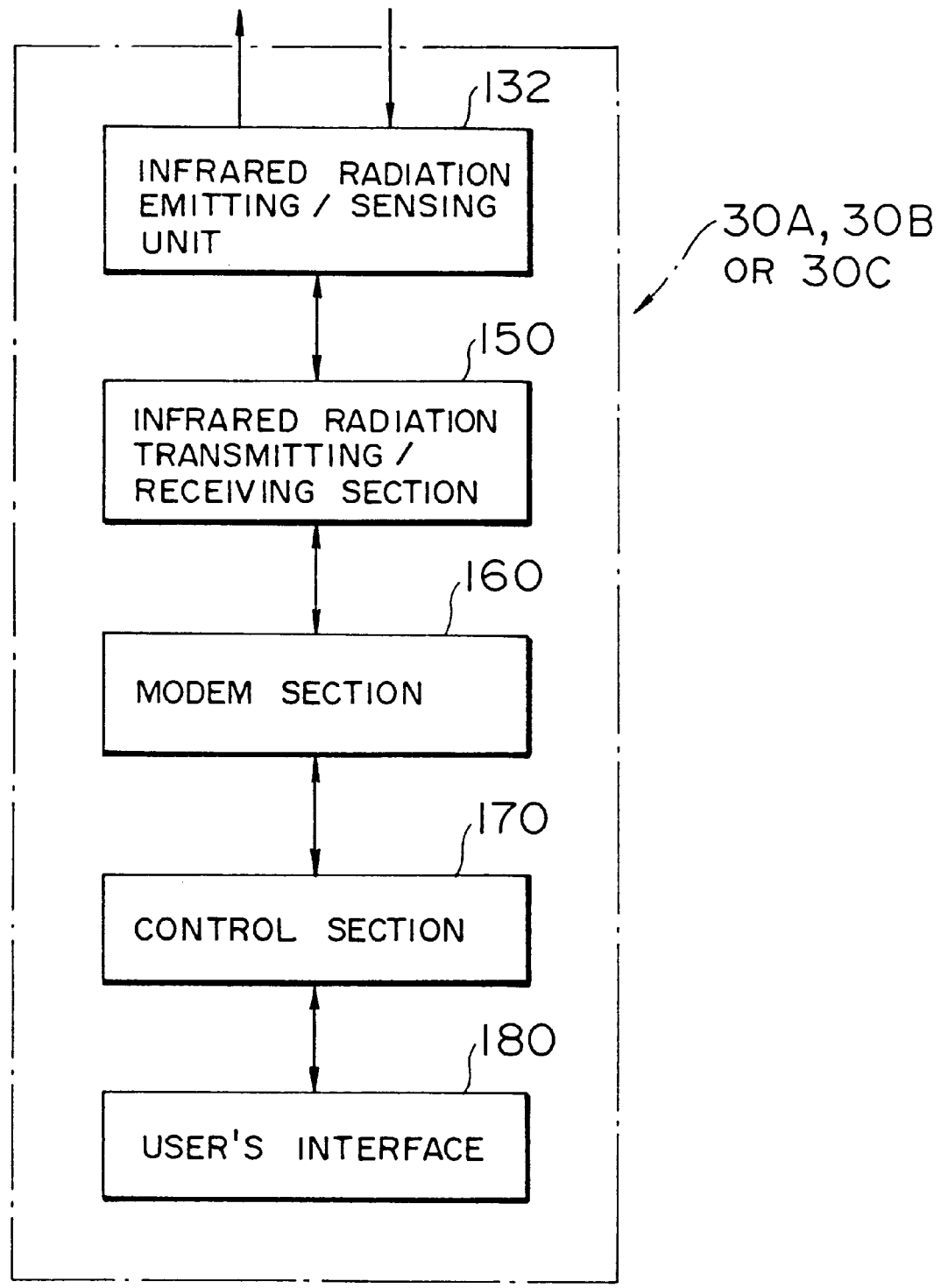
FIG. 7 is a block diagram showing the internal arrangement of a portable electronic apparatus according to the present invention.

FIG. 7 is a block diagram showing the internal arrangement of a portable electronic apparatus. Since the internal circuits of the portable electronic apparatuses 30A, 30B, 30C respectively shown in FIGS. 3A to 3C, FIGS. 4A and 4B, and FIGS. 5A and 5B are identical to each other, the internal circuit of the portable electronic apparatus 30 shown in FIGS. 5A and 5B will be described.

Information input from a user's interface 180 is modulated in a modem section 160 under the control of a control section 170 and transmitted from an infrared emitting/receiving element in the infrared emitting/receiving unit 132 to a partner's electronic apparatus through an infrared transmitting/receiving section 150 and the connector 141 with the cable shown in FIG. 6.

Information from a partner's electronic apparatus is sensed by the infrared emitting/receiving unit 132, demodulated in the modem section 160 through the infrared transmitting/receiving section 150, and output to the user's interface 180 under the control of the control section 170.

What we claimed is:

1. A portable electronic apparatus capable of performing infrared communication, comprising:

a main body;

an infrared emitting/receiving unit, said infrared emitting/receiving unit having a housing, and a shaft-like projecting portion projecting outward from said housing, said shaft-like projecting portion housing electrodes for said infrared emitting/receiving unit;

said main body having a recess in at least one outer face thereof to retain said infrared emitting/receiving unit; and a shaft-like engaging portion in the recess so as to engage said shaft-like projecting portion and thereby provide said infrared emitting/receiving unit being movably mounted on said main body.

2. A portable electronic apparatus capable of performing infrared communication, comprising:

a main body;

an infrared emitting/receiving unit movably mounted on said main body so as to externally change a position of said infrared emitting/receiving unit; said infrared emitting/receiving unit having a housing, an infrared emitting/receiving element, a projecting portion projecting outward from said housing of said infrared emitting/receiving unit, and a first electrode at a distal end of said projecting portion and electrically connected to said infrared emitting/receiving element; and a second electrode at an end face of said projecting portion and contacting said first electrode.

3. An apparatus according to claim 2, wherein the direction of said infrared emitting/receiving unit can be changed over two outer surfaces of said portable electronic apparatus main body.

4. An apparatus according to claim 2, wherein said infrared emitting/receiving unit can slide on at least one surface of said portable electronic apparatus main body.

5. An apparatus according to claim 2, wherein said first electrode is a conductive elastic member.

6. An apparatus according to claim 5, wherein said first electrode is a leaf spring.

7. An apparatus according to claim 2, wherein said second electrode is a contact plate.

8. An apparatus according to claim 2, wherein said main body having a retaining portion in at least one outer surface thereof to house said infrared emitting/receiving unit, and a projection engaging portion is in the retaining portion to engage said projecting portion of said infrared emitting/receiving unit.

9. An apparatus according to claim 8, wherein said projecting portion includes a through hole, and said second electrode is connected to a circuit device in said portable electronic apparatus main body through the through hole.

10. An apparatus according to claim 8, wherein said retaining portion is a recessed portion.

11. An apparatus according to claim 8, wherein said retaining portion is a notch.

12. An apparatus according to claim 8, wherein said retaining portion is a groove.

13. A portable electronic apparatus capable of performing infrared communication, comprising;

a main body;

an infrared emitting/receiving unit, said infrared emitting/receiving unit having a housing, and a shaft-like projecting portion projecting outward from said housing;

said main body having a recess in at least one outer face thereof to retain said infrared emitting/receiving unit; and a shaft-like engaging portion longitudinally disposed in the recess and engaging said shaft-like projecting portion to provide said infrared emitting/receiving unit with slidable movement in said main body.

* * * * *